United States Patent [19]
Breslin et al.

[11] Patent Number: 5,813,071
[45] Date of Patent: *Sep. 29, 1998

[54] TELESCOPING TRUCK LOADING RAMP ASSEMBLY

[75] Inventors: Patrick William Breslin, Wickenburg; Mark V. Shoen, Mesa, both of Ariz.

[73] Assignee: U-Haul International, Inc., Phoenix, Ariz.

[ * ] Notice: The terminal 25 months of this patent has been disclaimed.

[21] Appl. No.: 193,563

[22] Filed: Feb. 8, 1994

[51] Int. Cl.⁶ ..................................................... E01D 1/00
[52] U.S. Cl. ............................................. 14/71.1; 414/537
[58] Field of Search .................................. 14/69.5, 71.1; 414/537

[56] References Cited

U.S. PATENT DOCUMENTS

| | | |
|---|---|---|
| 3,511,393 | 5/1970 | Abromavage et al. . |
| 3,559,826 | 2/1971 | Abromavage et al. . |
| 3,642,156 | 2/1972 | Stenson . |
| 3,713,662 | 1/1973 | Abromavage et al. . |
| 3,977,545 | 8/1976 | Lloyd . |
| 4,003,483 | 1/1977 | Fulton . |
| 4,601,632 | 7/1986 | Agee . |
| 4,628,561 | 12/1986 | Kushniryk ........................... 414/537 X |
| 4,685,857 | 8/1987 | Goesere et al. . |
| 4,845,792 | 7/1989 | Bakula et al. . |
| 4,884,838 | 12/1989 | Slater . |
| 4,900,217 | 2/1990 | Nelson . |
| 4,912,796 | 4/1990 | Crump . |
| 4,929,018 | 5/1990 | Carty . |
| 5,244,335 | 9/1993 | Johns ....................................... 414/537 |
| 5,312,149 | 5/1994 | Boone ................................. 414/537 X |
| 5,331,701 | 7/1994 | Chase et al. ......................... 414/537 X |

*Primary Examiner*—William P. Neuder
*Attorney, Agent, or Firm*—Jeffer, Mangels, Butler & Marmaro LLP

[57] ABSTRACT

A ramp assembly facilitating the loading and unloading of a truck comprises two telescoping ramp sections including a forward section and a rearward section movable relative to each other between a full length ramp operating configuration and a stowed configuration. In one embodiment, the side rails of the rearward section of the ramp are slidably received within sleeve-like side rails of the forward section. In the stowed configuration of the ramp assembly, the ramp assembly is approximately half its fully extended length and fits between the existing longitudinal chassis frame members under the cargo deck of the truck without interfering with the housing of the truck differential. Accordingly, the invention makes possible the use of a full length ramp with virtually all truck sizes.

9 Claims, 8 Drawing Sheets

TELESCOPING TRUCK LOADING RAMP ASSEMBLY

FIELD OF THE INVENTION

The present invention relates generally to ramp assemblies stowable beneath a truck body within the confines of the existing chassis of the truck, and particularly to extendable ramp assemblies that are compact in their stowed configuration.

BACKGROUND OF THE INVENTION

Ramps which are stowable under the cargo bed of a truck within the confines of the longitudinal chassis frame members are known, as exemplified by U.S. Pat. Nos. 3,511,393 and 3,559,826, incorporated herein by reference. As explained in those patents, the ramp is longitudinally withdrawn from the rear of the truck and when fully extended is pivoted down about the forward end of the ramp so that the rear end of the ramp rests on the ground thus providing an inclined walkway for loading and unloading cargo.

It will be evident that a longer ramp provides a more gradual incline than a shorter ramp and thereby facilitates the loading and unloading of cargo from the truck. Long ramps cannot be used, however, where the loading area behind the truck is shorter than the length of the ramp. Further, where a loading dock is available, long ramps often require the truck to be positioned further from the dock to permit full extension of the ramp so as to properly secure the ramp at its forward end. The load must thus be moved over a longer distance between the truck and the dock.

The stowable ramp concept of the prior art has another drawback. Short trucks are limited to a short ramp (or no ramp) because of the limited storage space available under the cargo deck of the truck. A short ramp, however, results in a steep ramp angle, depending on deck height, making the loading and unloading of heavy objects unduly strenuous.

In order to accommodate a full length ramp underneath the cargo deck of some trucks, it is necessary to avoid interference between the ramp and the truck differential housing which projects upwardly into the space between the longitudinal chassis frame members. Two expedients to avoid such interference are disclosed in the aforementioned incorporated U.S. Pat. No. 3,511,393. First, as shown in FIGS. 15–25 of the '393 patent, the truck body deck can be raised by adding a sub-frame over the existing chassis frame members to provide space for the ramp. Secondly, as shown in FIGS. 11–14 of that patent, the ramp floor may include resilient transverse members that rest on the differential housing and absorb bumping shocks from the differential housing as the truck travels over uneven road surfaces. Trucks not equipped with such sub-frames or specially constructed full length ramps are limited to short ramps which, when stowed, extend only to the vicinity of the differential housing. An example of the latter is disclosed in U.S. Pat. No. 4,929,018, also incorporated herein by reference.

SUMMARY OF THE INVENTION

In accordance with the broader aspects of the present invention, there is provided a telescoping ramp assembly having an operating configuration that is sufficiently long to provide a gradual ramp incline and a stowed configuration that is short enough to easily fit within the confines of the existing chassis of a short truck. The present invention thus makes possible the use of a full length ramp that is stowable in the space between the existing chassis frame members in which the longitudinal extent of the space is limited because of the presence of structure such as the differential housing. The invention obviates the need for special, resilient ramp floor materials or the addition of a sub-frame over the existing frame channels heretofore required in some trucks in order to accommodate a full length ramp.

The ramp assembly of the invention comprises two telescoping sections including a forward section and a rearward section movable relative to each other between a full length ramp operating configuration and a stowed configuration. In its stowed configuration, the ramp is approximately half its fully extended length and fits between the existing longitudinal chassis frame members under the cargo deck of the truck without interfering with the housing of the truck differential. In accordance with one specific aspect of the invention, the side rails of the rearward section of the ramp are received within sleeve-like side rails of the forward section, slide bearings being provided between the side rails of the ramp sections to facilitate relative movement thereof.

The ramp assembly of the invention can be kept small for use when a loading dock on other means (platforms, steps, etc.) is available. In this situation, full size ramps require the truck to be positioned further from the dock or other means noted above. A shorter ramp allows the truck to be located closer to the dock or other means noted above resulting in less distance over which a load must be moved. The telescoping ramp assembly of the invention can also accommodate situations in which space behind the truck is limited thereby preventing use of a full length ramp. Because the ramp length is adjustable, the ramp may be partially extended to a length consistent with the limited space available.

BRIEF DESCRIPTION OF THE DRAWINGS

Further objects, features and advantages of the invention will become apparent from the detailed description of the preferred embodiment, below, when read in conjunction with the accompanying drawings in which.

DETAILED DESCRIPTION OF THE PREFERRED EMBODIMENT

The following describes the preferred embodiment of the invention and represents the best mode contemplated for its practice. This description is not to be taken in a limiting sense but is made merely for the purpose of describing the general principles of the invention whose scope is defined by the appended claims.

In the description which follows, the term "longitudinal" is intended to apply to a direction extending generally along the length of the ramp assembly while the term "transverse" is intended to apply to a direction extending generally across the width of the ramp assembly, that is, a direction generally perpendicular to the longitudinal direction. Further, "forward" and "front" are used to define those structural features of the deployed ramp assembly that are closer to the truck relative to the features designated as "rearward" or "rear".

Figure 1:
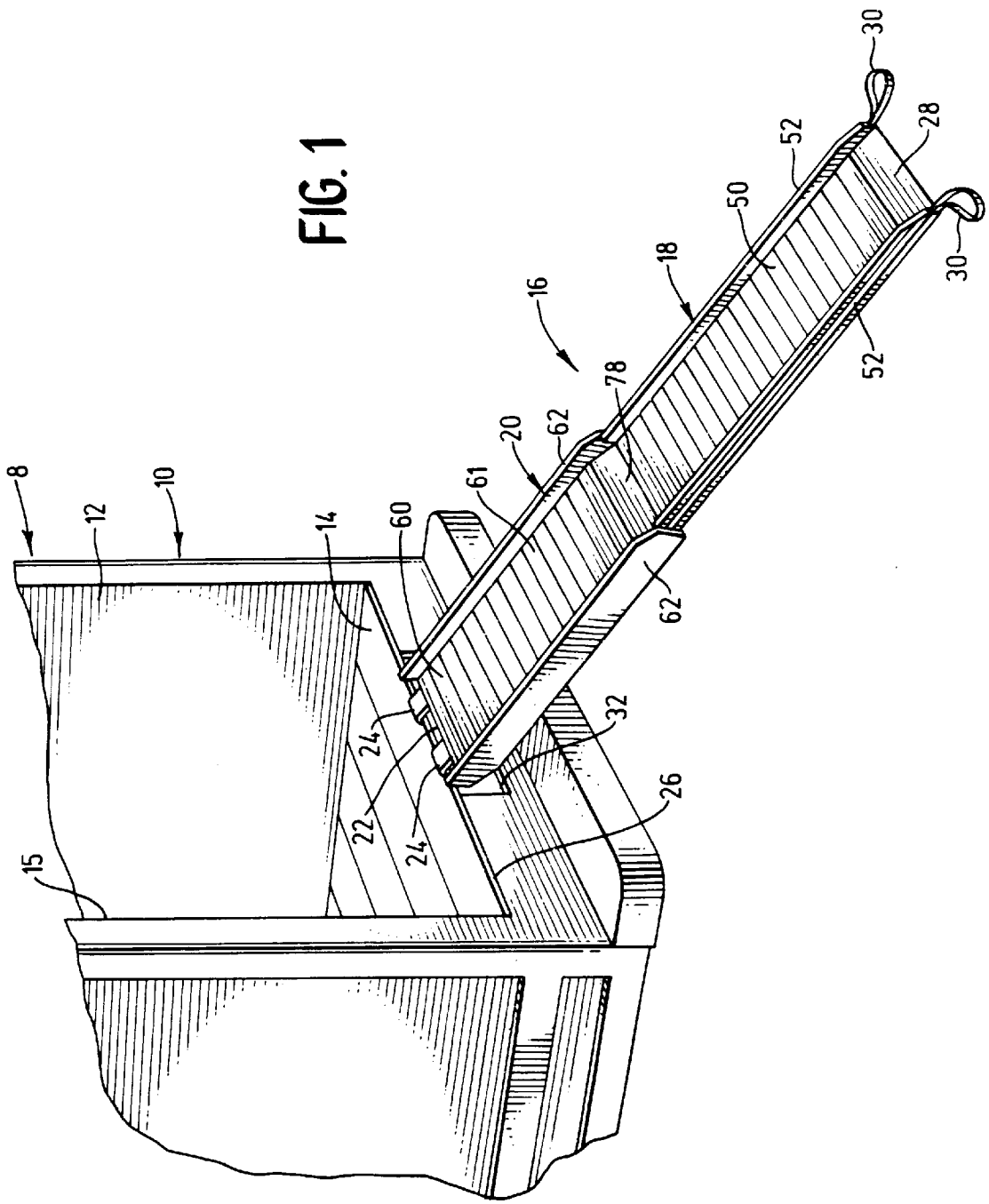
FIG. 1 is a perspective view of a portion of the rear of a truck showing deployed therefrom a telescoping ramp assembly in accordance with the present invention.

FIG. 1 shows the rear portion of a truck 8 including a body 10 containing a cargo space 12 having a floor or deck 14 and a rear door opening 15. Rental industry trucks generally have enclosed bodies and are typically used by do-it-yourself renters or transporters, often for moving personal belongings. It is customary in the truck rental industry to provide the truck with a ramp extendable from the rear of the truck to facilitate loading and unloading the cargo space 12 through the rear door opening 15. In accordance with the present invention there is provided a telescoping ramp assembly 16 comprising a rearward section 18 slidably received within a forward section 20. The ramp sections 18 and 20 are thereby movable relative to each other between a fully extended, operating configuration of the telescoping ramp assembly and a fully collapsed, stowed configuration. In the fully extended or operating configuration of the ramp assembly 16, shown in FIG. 1, the rearward section 18 of the ramp is substantially fully withdrawn from the forward section 20. In this configuration, the ramp assembly 16 has a length comparable to prior art full length ramps, such as that shown in aforementioned U.S. Pat. No. 3,511,393, and thus is sufficiently long to provide a gradual incline to minimize the effort required to move articles up and down the ramp.

The ramp assembly 16 includes a forward end 22 provided with means for attaching the ramp 16 to the truck body at approximately the level of the cargo deck 14. In the embodiment shown in the drawings, this attaching means may take the form of a pair of spaced apart hooks 24 adapted to engage, in a manner well known in the art, a transverse structural member 26 extending along the lower edge of the rear door opening 15. The ramp assembly 16 further includes a sloped rear end 28 adapted to rest on the ground in the operating configuration of the ramp, as shown in FIG. 1. The rear end 28 may include a pair of straps 30 or similar means to facilitate the movement and handling of the ramp.

Figure 2:
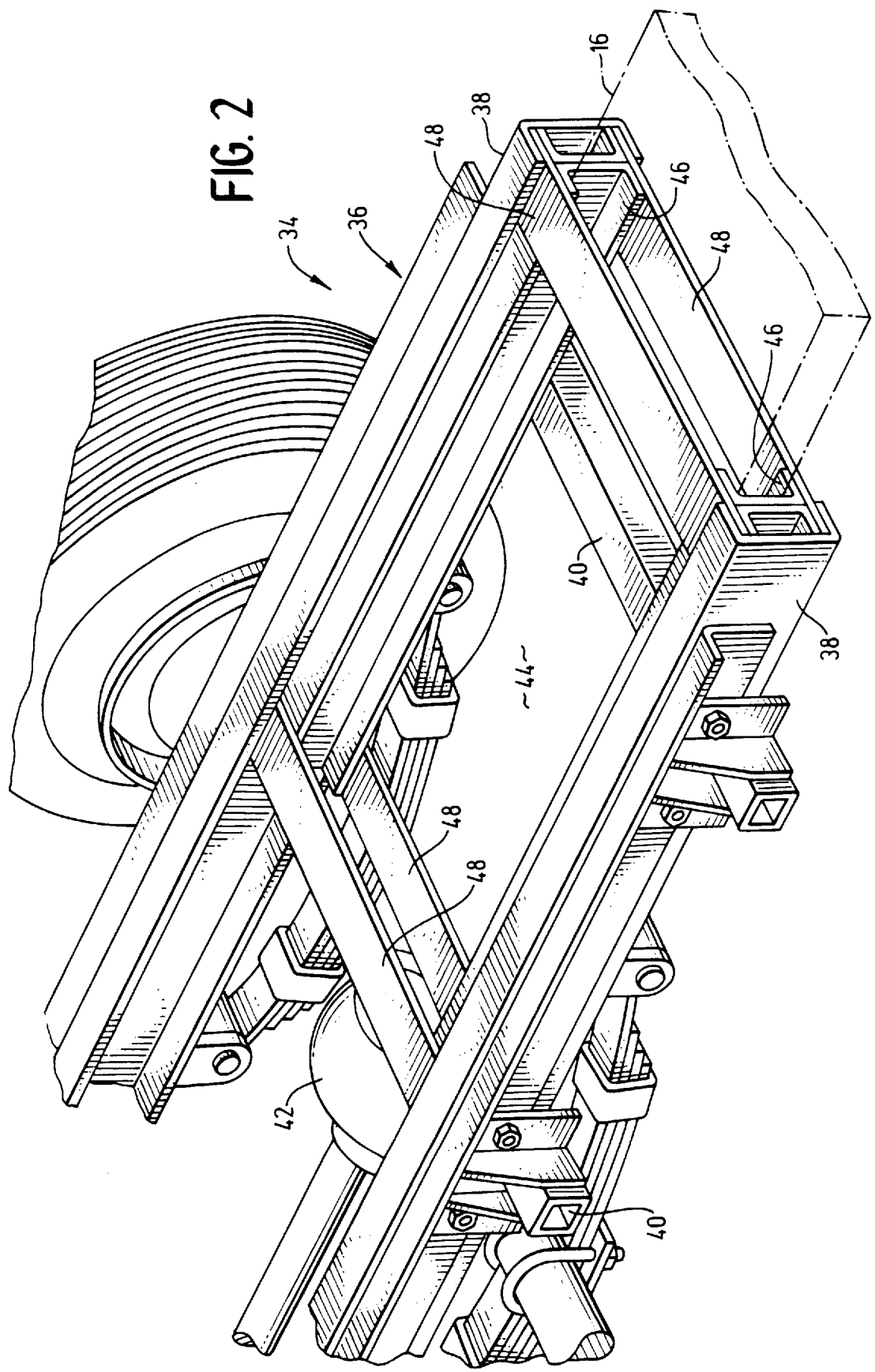
FIG. 2 is a perspective view of a conventional truck chassis modified to carry a telescoping ramp assembly in accordance with the invention.

When not in use, the ramp assembly 16 is stored in its collapsed or stowed configuration under the cargo deck 14. For this purpose, the rear of the truck body 10 is provided with a transverse opening 32 through which the ramp is inserted and withdrawn. With reference to FIG. 2, the truck 8 has a chassis 34 including a frame 36 principally comprising a pair of longitudinally extending, spaced apart frame members 38 and several transverse frame members 40, two of which are shown. The truck 8 also includes a rear wheel drive having a differential 42 whose casing projects upwardly into the space between the longitudinal frame members 38. Thus, for short trucks in particular, the length of the usable space between the existing frame members available for storing a ramp is limited by the differential housing. To accommodate a full length ramp under the deck of a short truck it has therefore been necessary to either incorporate flexible rubber or plastic sections in the ramp to engage the differential housing to prevent damage to the ramp, or to incorporate a differential-clearing, ramp-receiving sub-frame over the main frame members. Both of these approaches are disclosed in the above-referenced U.S. Pat. No. 3,511,393.

In accordance with the present invention which provides a telescoping ramp assembly collapsible to about half the length of a full size ramp, only the portion of the space between the existing main frame members rearwardly of the differential housing needs to be used for storage of the ramp thereby obviating the need for sub-frames and special ramp materials.

The existing longitudinal frame members 38 comprise facing, C-shaped channels defining between them an open region 44 the full transverse extent of which may be utilized for storage of the ramp. In this fashion, the use of a wide ramp assembly is made possible, as explained in U.S. Pat. No. 4,929,018 referenced earlier. Alternatively, as shown in FIG. 2 herein, to accommodate narrower ramp assemblies, a pair of auxiliary longitudinal channels 46 extending rearwardly from the vicinity of the differential 42 may be provided. The channels 46 may be secured to the existing frame members in various ways. For example, the channels 46 may be welded to pairs of transverse plates 48 in turn welded to the upper and lower flanges of the chassis frame members 38. The ramp assembly 16, the outline of which is shown in phantom in FIG. 2, is received by the auxiliary channels 46, in a manner well known in the art, with stops (not shown) being provided to limit the extent of insertion of the ramp.

Figure 3:
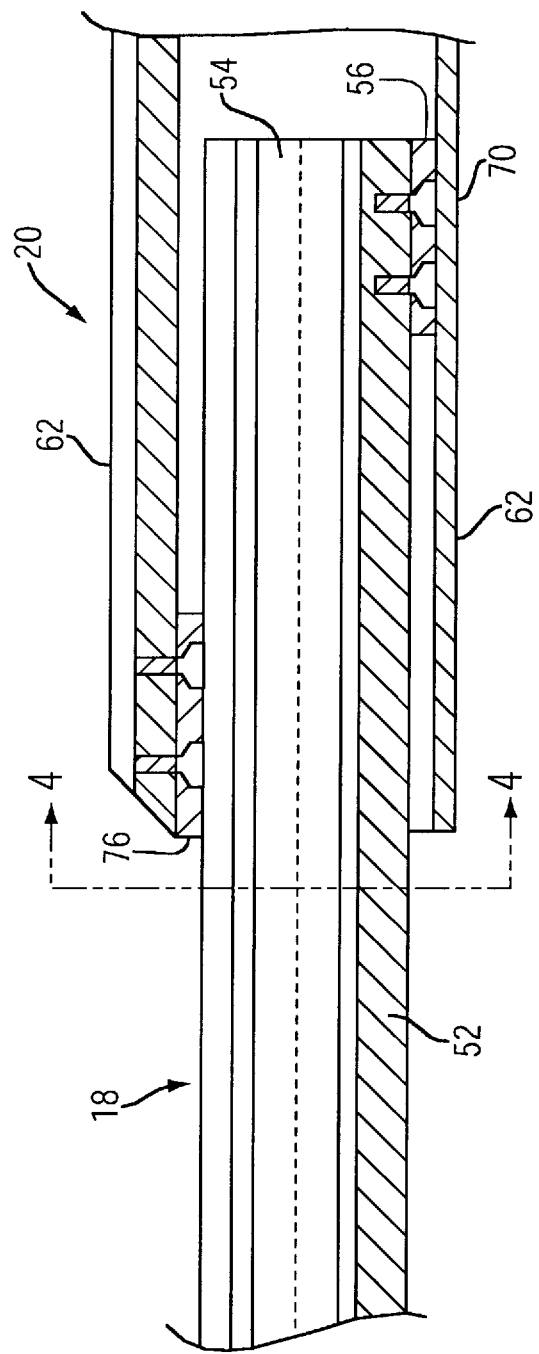
FIG. 3 is a side elevation view, in section, of a portion of the ramp assembly of the invention.
Figure 4:
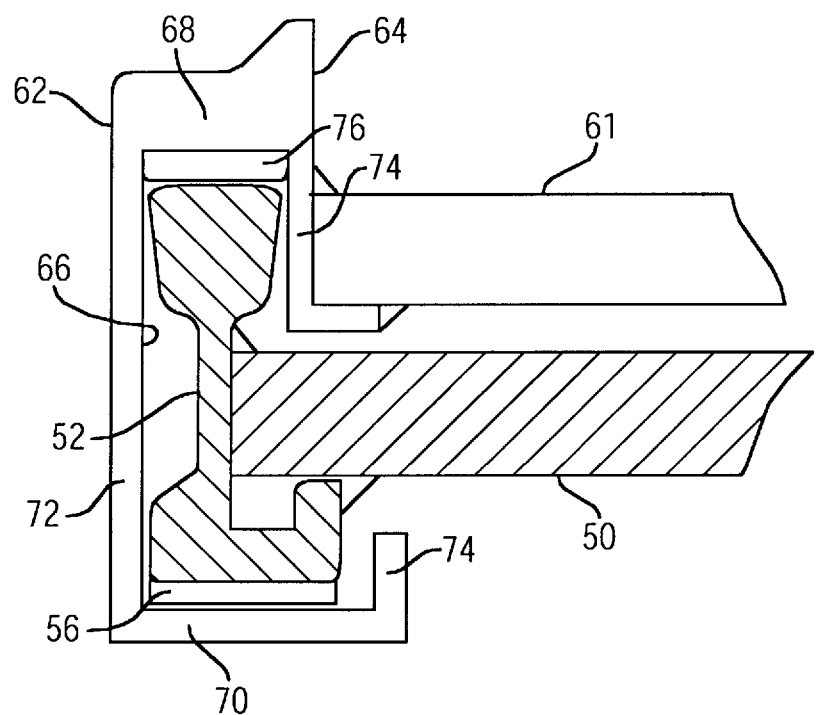
FIG. 4 is a transverse cross section of a portion of the ramp assembly of the invention as seen along 4—4 in FIG. 3.

With reference now also to FIGS. 3–7, the rearward ramp section 18 includes a transverse ramp floor 50 welded at its outer extremities to longitudinal side rails 52. The rearward ramp section 18 has a rear end portion 53 (FIG. 7) and a front end portion 54 (FIG. 3), the latter being received by the ramp section 20. Attached to the lower surface of each side rail 52 along the front portion 54 thereof is a slide bearing 56. The forward ramp section 20 includes a rear end portion 60 (FIG. 5 and 7) and a transverse ramp floor 61 the outer extremities of which are welded to longitudinal side rails 62. Each side rail 62 has an upstanding inner side wall 64 (FIGS. 4 and 6) extending upwardly from the ramp floor 61. Each side rail 62 is in the form of a sleeve, having a generally rectangular, hollow cross section, as best seen in FIG. 4, so as to define an interior trackway 66 for receiving one of the side rails 52 of the rearward ramp section 18. The trackway 66 is bounded by upper and lower walls 68 and 70, respectively, and outer and inner side walls 72 and 74, respectively, which define interior guide surfaces for the side rail 52. The slide bearing 56, attached to the side rail 52, engages the interior surface of lower wall 70; a similar slide bearing 76, attached to the interior surface of the upper wall 68 of the side rail 62 adjacent the rear end portion 60 of the ramp section 20 (FIGS. 5 and 7), engages the upper surface of the side rail 52 (FIG. 4). The slide bearings minimize friction, making it possible to easily move the ramp sections 18 and 20 relative to each other so as to facilitate collapsing and extending the ramp assembly 16 (FIG. 1).

The ramp floors 50 and 61 of the rearward and forward ramp sections, respectively, are in overlapping relationship with the ramp floor 61 of the forward section being above the level of the ramp floor 50 of the rearward section (FIG. 4). As a result, there is no obstruction to moving a load down the ramp. The rear edge 78 of the ramp floor 61 may be beveled as seen in FIG. 6 to provide a smooth transition between the ramp floors of the ramp sections so as to facilitate movement of loads at the transition.

Figure 5:
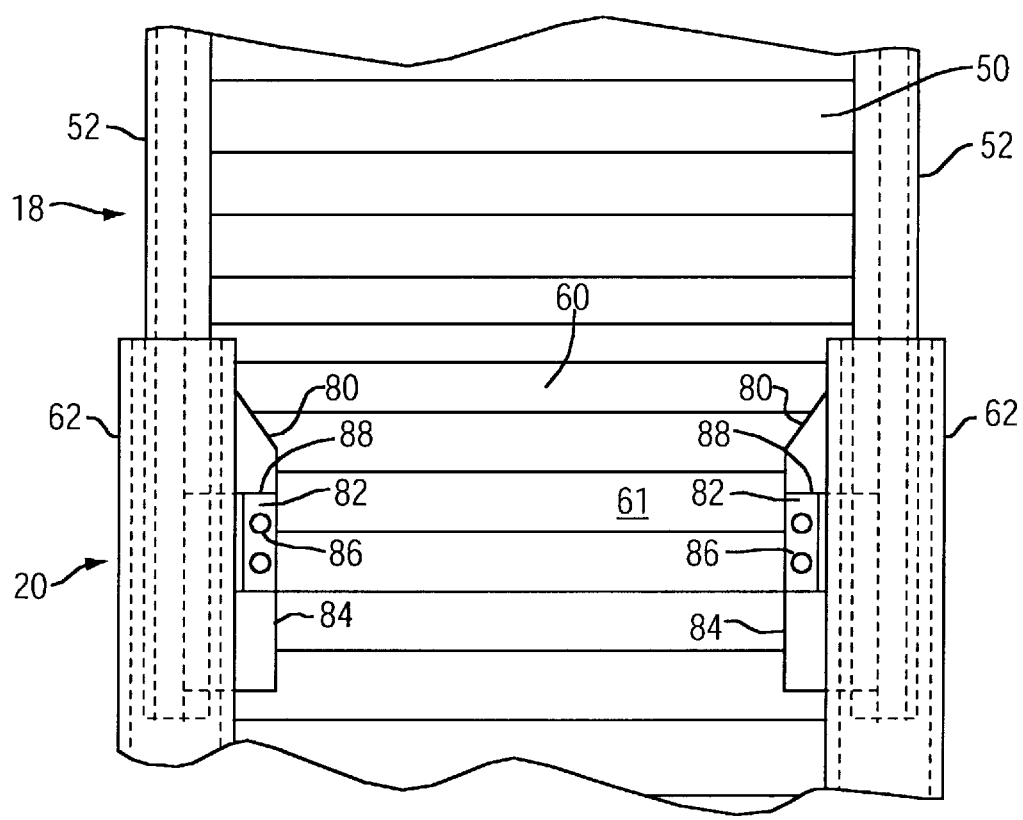
FIG. 5 is a bottom plan view of a portion of the ramp assembly of the invention showing the relationship between the ramp sections in the fully extended configuration of the ramp assembly.
Figure 6:
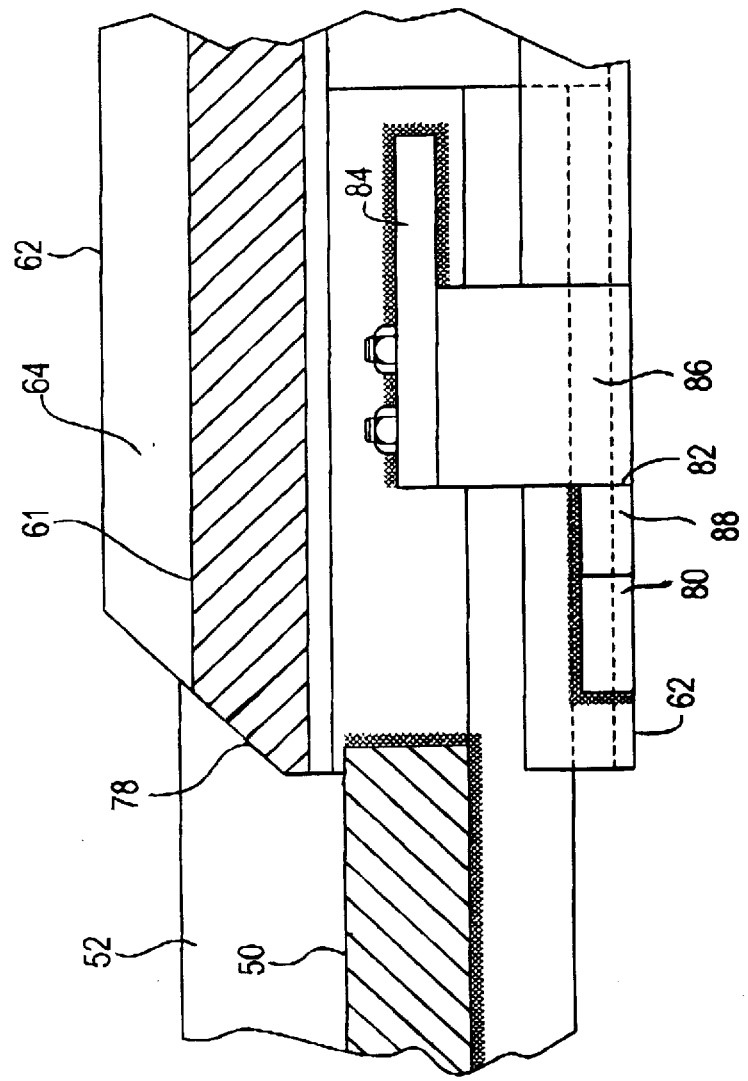
FIG. 6 is a side elevation view of a portion of the interior of the ramp assembly of the invention showing details of a limit stop means in the fully extended configuration of the ramp assembly.
Figure 7:
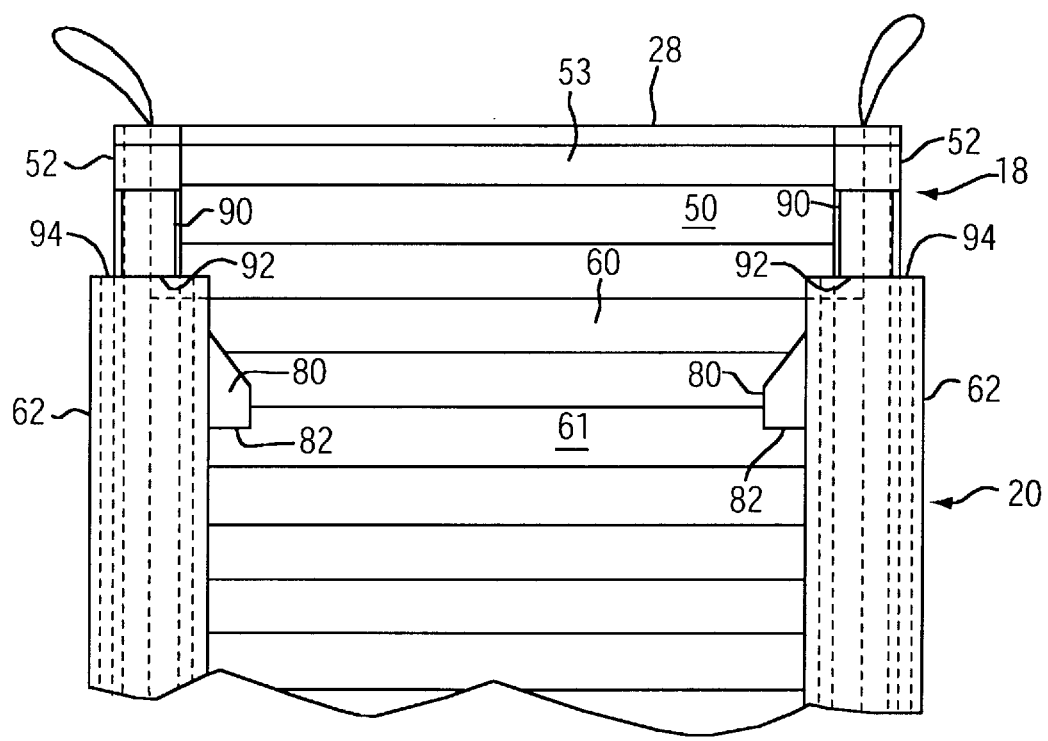
FIG. 7 is a bottom plan view of a portion of the ramp assembly of the invention showing the relationship between the ramp sections in the fully collapsed or stowed configuration of the ramp.

With reference to FIGS. 5, 6 and 7, the ramp assembly of the invention includes coacting stop means to limit the extension of the ramp assembly. This prevents separation of the ramp sections and assures that there will always be a minimum amount of overlap between the ramp sections so that the ramp assembly can accommodate maximum loads without buckling. An inwardly projecting plate 80 having a front face 82 is welded to the inner surface of each side rail 62 at a point adjacent the rear end portion 60 of the forward ramp section 20. A plate 84 is similarly welded to the inner surface of each side rail 52 so as to project inwardly therefrom proximate the front end portion 54 of the rearward ramp section 18 (FIG. 3). As shown in FIGS. 5 and 6, bolted to each plate 84 and depending therefrom is a block 86 having a rear face 88. Extension of the ramp to its full length causes the faces 82 and 88 to come into contact preventing further extension of the ramp assembly.

With reference to FIG. 7, welded to the lower surface of each side rail 52 of the rearward ramp section 18 adjacent the rear end portion 53 thereof, is a stop plate 90 having a front face 92. Collapsing of the ramp assembly 16 causes the faces 92 of the stop plates 90 to come into contact with the rear extremities 94 of the side rails 62 thereby preventing further telescoping of the ramp sections beyond the fully collapsed, stowed configuration shown in FIG. 7.

Figure 8:
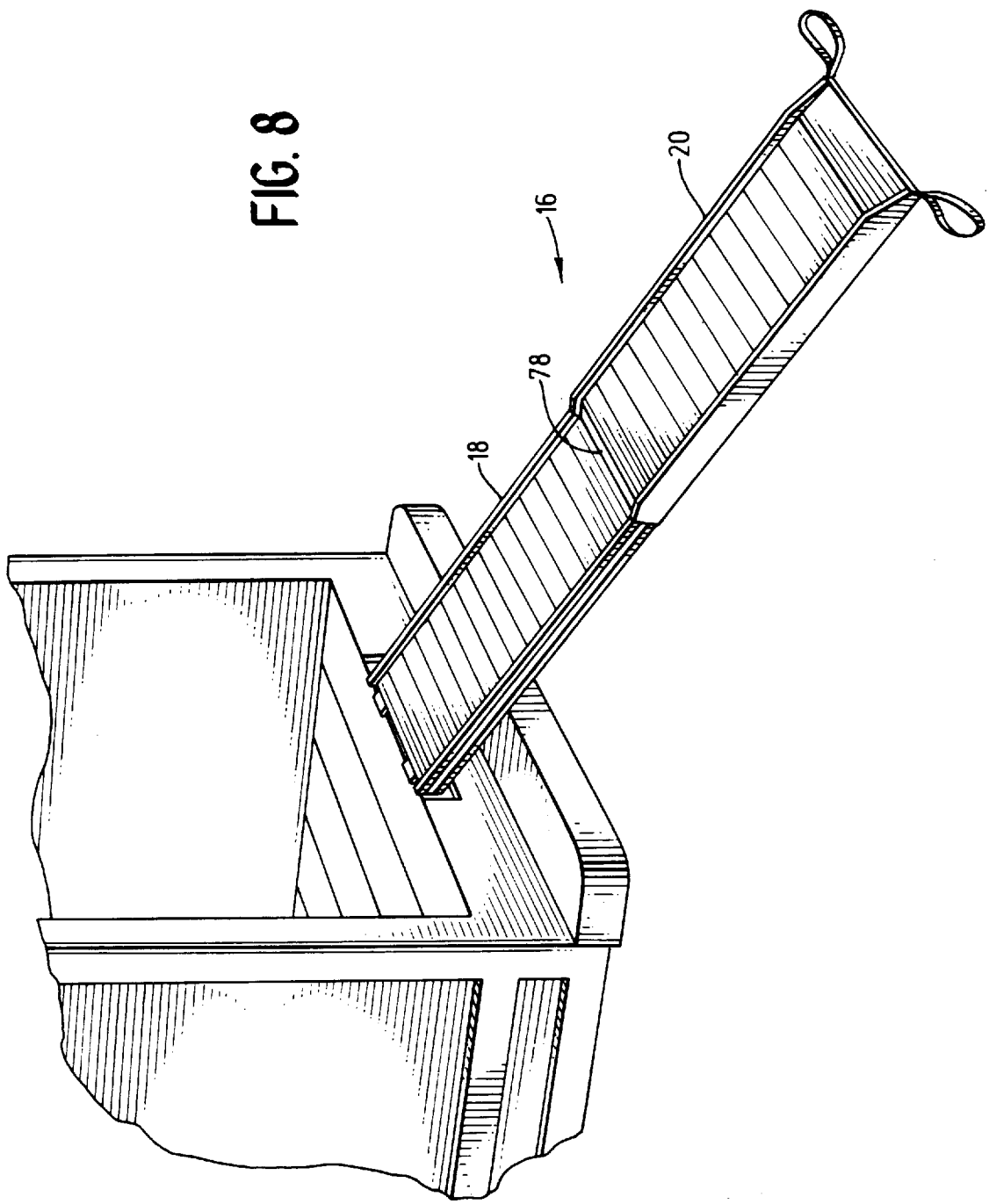
FIG. 8 is a perspective view of a portion of the rear of a truck showing deployed therefrom a telescoping ramp assembly in accordance with an alternative embodiment of the present invention.

It will be evident that the ramp sections 18 and 20 may be reversed so that the ramp section 18 comprises the forward section and ramp section 20, which receives the ramp section 18, forms the rearward section. This alternative arrangement is shown in FIG. 8. An advantage of this alternative embodiment is that the transition bevel 78 at the front end of the rearward ramp section 20 is at an angle that is less steep than the ramp floors thereby facilitating movement of heavy loads up the ramp assembly.

It will be understood by those skilled in the art that the structures described and shown herein may be modified without departing from the spirit and scope of the invention as defined in the claims which follow, and it is intended that the structures described herein and shown in the accompanying drawings are to be construed as illustrative only.

What is claimed is:

1. A ramp assembly stowable within the confines of the spaced apart, longitudinal frame members of the chassis of a truck without interference with the differential housing of the truck, said truck including a body carried by said chassis, said truck body defining a cargo space having a rear door opening, the ramp assembly comprising:

a pair of elongated ramp sections of substantially equal length and comprising (a) a forward section having front and rear end portions, longitudinal side rails and a ramp floor attached to and extending between the side rails and (b) a rearward section having front and rear end portions, side rails and a ramp floor extending between the side rails of the rearward section, the side rails of one of the ramp sections comprising longitudinally extending sleeves each defining an interior trackway for receiving one of the side rails of the other ramp section, the other ramp section being thereby adapted to be received within the confines of the one ramp section in overlapping, telescoping fashion with the ramp floor of the one ramp section being above the ramp floor of the other ramp section, the ramp sections being movable relative to each other between a collapsed, stowed configuration of the ramp assembly in which the other ramp section is substantially completely disposed within the confines of the one ramp section, and a fully extended, operating configuration of the ramp assembly in which only the rear end portion of the one ramp section and the front end portion of the other ramp section are in overlapping, telescopic relationship; and means mounted on the front end portion of the one ramp section for pivotably attaching said end portion to the truck body at the door opening adjacent the rear of the cargo space.

2. A ramp assembly, as defined in claim 1, which includes:

coacting stop means mounted on the forward and rearward ramp sections for limiting the extension and collapse of the ramp sections relative to each other.

3. A ramp assembly, as defined in claim 1, in which:

said one ramp section comprises the forward ramp section and said other ramp section comprises the rearward ramp section.

4. A ramp assembly, as defined in claim 3, in which:

the rear end portion of the ramp floor of the forward ramp section includes a beveled surface providing a smooth transition between the ramp floors of the ramp sections.

5. A ramp assembly, as defined in claim 1, in which:

said one ramp section comprises the rearward ramp section and said other ramp section comprises the forward ramp section.

6. A ramp assembly, as defined in claim 5, in which:

the front end portion of the ramp floor of the rearward ramp section includes a beveled surface providing a smooth transition between the ramp floors of the ramp sections.

7. A ramp assembly stowable within the confines of the spaced apart, longitudinal frame members of the chassis of a truck without interference with the differential housing of the truck, said truck including a body carried by said chassis, said truck body defining a cargo space having a rear door opening, the ramp assembly comprising:

a pair of elongated ramp sections of substantially equal length and comprising (a) a forward section having front and rear end portions, longitudinal side rails and a ramp floor attached to and extending between the side rails and (b) a rearward section having front and rear end portions, side rails and a ramp floor extending between the side rails of the rearward section, the side rails of the forward section comprising longitudinally extending sleeves each defining an interior trackway for receiving one of the side rails of the rearward section, the rearward ramp section being thereby adapted to be received within the confines of the forward ramp section in overlapping, telescoping fashion with the ramp floor of the forward section being above the ramp floor of the rearward section, the ramp sections being movable relative to each other between a collapsed, stowed configuration of the ramp assembly in which the rearward section is substantially completely disposed within the confines of the forward section, and a fully extended, operating configuration of the ramp assembly in which only the rear end portion of the forward section and the front end portion of the rearward section are in overlapping, telescopic relationship;

means mounted on the front end portion of the forward ramp section for pivotably attaching said end portion to the truck body at the door opening adjacent the rear of the cargo space; and coacting stop means mounted on the forward and rearward ramp sections for limiting the extension and collapse of the ramp sections relative to each other.

8. A ramp assembly, as defined in claim 7, in which:

the trackway of each forward ramp section side rail has an interior, downwardly facing horizontal wall and an interior, upwardly facing horizontal wall; and each rearward ramp section side rail has upper and lower surfaces;

the ramp assembly further including:

a first slide bearing mounted on the interior, downwardly facing wall of each forward ramp section trackway adjacent the rear end portion of the forward ramp section, said first slide bearings contacting the upper surface of the rearward ramp slide rails; and a second slide bearing mounted on the lower surface of each rearward ramp section side rail adjacent the front end portion of the rearward ramp section, said second slide bearings contacting the interior, upwardly facing walls of the forward ramp section trackways.

9. A ramp assembly, as defined in claim 7, in which:

the rear end of the ramp floor of the forward ramp section is beveled to form a smooth transition between the floors of the ramp sections.

\* \* \* \* \*